(12) United States Patent
Liu et al.

(10) Patent No.: US 8,117,337 B2
(45) Date of Patent: Feb. 14, 2012

(54) METHOD AND DEVICE FOR IMPLEMENTING LINK PASS THROUGH IN POINT-TO-MULTIPOINT NETWORK

(75) Inventors: Mingwei Liu, Shenzhen (CN); Feng Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 268 days.

(21) Appl. No.: 12/425,069

(22) Filed: Apr. 16, 2009

(65) Prior Publication Data

US 2009/0199040 A1    Aug. 6, 2009

Related U.S. Application Data

(63) Continuation of application No. PCT/CN2007/070926, filed on Oct. 18, 2007.

(30) Foreign Application Priority Data

Oct. 20, 2006  (CN) .......................... 2006 1 0150577

(51) Int. Cl.
*G06F 13/00* (2006.01)
(52) U.S. Cl. ....................................... 709/238; 709/239
(58) Field of Classification Search .................. 709/238, 709/239
See application file for complete search history.

(56) References Cited

U.S. PATENT DOCUMENTS

| | | | |
|---|---|---|---|
| 6,560,617 B1 | 5/2003 | Winger et al. | |
| 7,453,825 B1 * | 11/2008 | Sivasankaran et al. | 370/255 |
| 2004/0170128 A1 | 9/2004 | Takamichi | |
| 2006/0215570 A1 | 9/2006 | Zhang et al. | |

FOREIGN PATENT DOCUMENTS

| | | |
|---|---|---|
| CN | 1492623 | 4/2004 |
| CN | 1492623 A | 4/2004 |
| CN | 1501642 A | 6/2004 |
| CN | 1780231 | 5/2006 |
| EP | 1562390 | 8/2005 |
| JP | 2001326620 | 11/2001 |

OTHER PUBLICATIONS

Office action issued in corresponding Chinese patent application No. 200780023651.0 , dated Nov. 12, 2010, and English translation thereof. total 11 pages.
Office action issued in corresponding Chinese patent application No. 200610150577.6 , dated May 15, 2009, and English translation thereof. total 6 pages.
Written Opinion issued in corresponding PCT application No. PCT/CN2007/070926 , dated Dec. 13, 2007,total 4 pages.

* cited by examiner

*Primary Examiner* — Kenneth R Coulter

(57) ABSTRACT

Methods and devices for implementing Link Pass Through in a point-to-multipoint network in respect of the network reliability field are provided. Embodiments of the present invention are applicable to a network having an access gate, an access device, an aggregation device and a router. When a failure occurs in an active link between the access device and the aggregation device or between the aggregation device and the router, the access device breaks the connection between the access device and the access gate enables a standby link to conduct communication. Advantageously, when a failure occurs in the active link between the access device and the aggregation device or between the aggregation device and the router, the access device may break the connection between the access device and the access gate and the access gate may enable a standby link to conduct communication. Therefore, no matter what type of failure occurs, the embodiments of the present invention may enable a standby link to conduct communication, ensuring thereby communication reliability.

11 Claims, 3 Drawing Sheets

METHOD AND DEVICE FOR IMPLEMENTING LINK PASS THROUGH IN POINT-TO-MULTIPOINT NETWORK

CROSS-REFERENCE TO RELATED APPLICATIONS

This application is a continuation of International Patent Application No. PCT/CN2007/070926, filed on Oct. 18, 2007, which claims the benefit of Chinese Patent Application No. 200610150577.6, filed on Oct. 20, 2006, both of which are hereby incorporated by reference in their entireties.

FIELD OF THE INVENTION

The present invention relates to network communication technology, more specifically, to methods and devices for implementing link pass through in a point-to-multipoint network.

BACKGROUND

In point-to-multipoint aggregation type network, as illustrated in FIG. 1, an Access Gate (AG) uplink provides two Fast Ethernet (FE) interfaces, the active and the standby. During normal operation, services are available only on the active port, while no service is available on the standby port. The two FE ports of the Access Gate are connected to the two different ports of an access device A. Each Access Gate takes up two service network channels independently via the access device. The active channel provides an active router via an aggregation device C1, while the standby channel provides a standby router via an aggregation device C2. The active router and the standby router are connected by fiber directly, running Virtual Router Redundancy Protocol (VRRP). The aggregation devices C1 and C2 are connected by a Virtual Concatenation Group (VCG) channel or by a Gigabyte Ethernet (GE).

User data may have access to the service network via access devices A1, A2, and A3. When aggregated to aggregation devices C1 and C2, the user data may access to a Wide Area Network or a core network via the active router and the standby router, wherein the VRRP protocol is carried out between the active router and the standby router. The VRRP protocol may orchestrate a group of routers into a virtual router, referred to as a standby group. Such virtual router has its own IP address. The host in the network communicates with other network via this virtual router. If the active router in the standby group fails, the other standby routers in the standby group may become to be the new active router and continue to provide routing service for the host in the network.

As shown in FIG. 1, in normal condition, Access Gates AG1, AG2, and AG3 reach the aggregation device C1 via access device A1, A2, A3 and the active link, and finally arrive at the active router to complete the communication process. When the link between the active router and the aggregation device C1 fails, the communication between the active router and all access gates will be interrupted. At this moment, the standby network or link has to be enabled so as to ensure a normal transmission of the important data. As illustrated in dashed line, the standby link in the instance of FIG. 1 includes FE links between the access gates AG1, AG2, AG3 and the access device A1, A2, A3, and standby channels between the access device A1, A2, A3 and the aggregation device C2. The standby communication may also be carried out using the standby network. As illustrated in FIG. 2, the communication between the access gate AG3 and the aggregation device C2 may be carried out using Access device A4 and the aggregation device C3, or service network 2.

In point-to-multipoint network, when the partial or entire access point link (active link between the access gate and the access device) fails, the user access gate is able to detect the failure in the link and enables a standby link or network. The communication is conducted between the standby link or network and the aggregation device. The aggregation device does not need to be informed of the failure of the access link or network.

In point-to-multipoint network, if the aggregation device fails, the access device fails to know about the failure. If the access device still uses the original network to conduct communication, it turns out that the communication between the access gate and the aggregation device will be in a disconnected state.

In point-to-multipoint network, when the service network fails, the active router and the access gate fails to know about the failure. If the active router and the access gate still use the active link to conduct communication, the communication may be interrupted.

With respect to the above problems, prior art provides a technique for solving the link path through problem in point-to-point simple network. For symmetric point-to-point network, the principle and the implementation of such technique can be described as follows. The service device detects if any failure occurs on the Ethernet port link and the network link. When a failure occurs, the service device employs a control frame to pass the link failure information to the remote service device. The remote service device disconnects the user link and performs a corresponding processing in response to the received control frame containing the link failure information. The user at the failure end and the user at the remote end communicate through the standby network. When the link is repaired, the service device at the repaired end sends a control frame containing the link repaired information to the service device at the remote end and rebuilds the communication between the users along the original link. The technique does not differentiate the service devices of the two ends. As long as a failure occurred at one end, the other end will disconnect the link connected to the user for sure.

In FIG. 1, when a link or network failure occurs in the aggregation device C1, the access devices A1, A2 and A3 do not know about the failure in the uplink and may still use the active link to conduct communication. As a result, all the services between the access gates and the active router may be interrupted; even using point-to-point Link Pass Through (LPT) technique may not be able to inform multiple access points of the link status. When a link or network failure occurs in parts of the access devices, point-to-point LPT technique may inform the aggregation device of the link status of the access device. If the aggregation device disconnects the connection with the router after receiving notification of the link status, the services of the access devices where no link failure occurs may also be interrupted.

Point-to-point LPT technique can not be applied to point-to-multipoint network. The existing LTP technique only passes link status of two users or devices in the point-to-point network. The technique cannot be used to pass link status in aggregation type network when failures occur in multiple places or networks.

SUMMARY

To overcome the deficiency that the prior art is not able to implement LPT in the point-to-multipoint network, various embodiments of the present invention provide a method for implementing LPT in the point-to-multipoint network and a device for implementing the methods.

The embodiments of the present invention can be implemented according to the below technical solutions.

A method for implementing Link Pass Through in a point to multipoint network is provided according to one embodiment of the present invention. The method is applicable in a network having an access gate, an access device, an aggregation device and a router. When a failure occurs in an active link between the access device and the aggregation device or between the aggregation device and the router, the access device breaks the connection between the access device and the access gate enables a standby link to conduct communication.

A method for implementing LPT in a point-to-multipoint network is provided according to one embodiment of the present invention. The method includes: determining that a failure occurs in an active link between an access device and an aggregation device or between an aggregation device and a router; and breaking, by the access device, a connection between the access device and an access gate and triggering to enable a standby link to conduct communication.

A device for implementing LPT in a point-to-multipoint network is provided according to one embodiment of the present invention. The device includes: a detection module, configured to detect a link status or a service network status in the network, and send a corresponding link status notification when a failure occurs in the link or in the service network, the links to be detected including a link between the access device and the aggregation device, and a link between the aggregation device and the router; an execution module, configured to break the connection with a corresponding access gate after the access device receives the link state notification; and an active/standby switch module, configured to switch between an active link and a standby link or switch between an active network and a standby network when a link between the access gate and the access device is disconnected or restored.

A device for implementing LPT in a point-to-multipoint network is provided according to one embodiment of the present invention. The device includes: a detection module, configured to detect a link status or a service network status in the network, and send a corresponding network status signal based on the detection result; a link status notification generation module, configured to receive the network status signal sent from the detection module, and generate a link status notification based on the network status signal; a link status notification transmission module, configured to send the generated link status notification; an execution module, configured to break the connection with a corresponding access gate after receiving the link state notification; and an active/standby switch module, configured to switch between an active link and a standby link or switch between an active network and a standby network when a link between the access gate and the access device is disconnected or restored.

An access device is provided according to one embodiment of the present invention. The access device includes: a detection module, configured to detect a link status and a service network status in the network, the links to be detected including a link between an access device and an aggregation device, and a link between an access device and an access gate; and an execution module, configured to break the connection with a corresponding access gate after detecting a link status failure or a service network status failure, and trigger to enable a standby link to conduct communication.

Advantageously, according to the embodiments of the present invention, the problem of implementing LPT in a point-to-multipoint network is solved. When a link or network fails, an asymmetrical policy for passing and handling link status is employed to inform the remote end in a manner of status notification. Therefore, no matter what type of failure occurs, a standby link or standby network is enabled to conduct communication according to embodiments of the present invention. As such, the local device and the remote device may switch to the standby link or network in time, ensuring thereby the reliability of the communication.

BRIEF DESCRIPTION OF THE DRAWING(S)

DETAILED DESCRIPTION

Detailed description will be made to the present invention in conjunction with the accompanying drawings.

Figure 1:
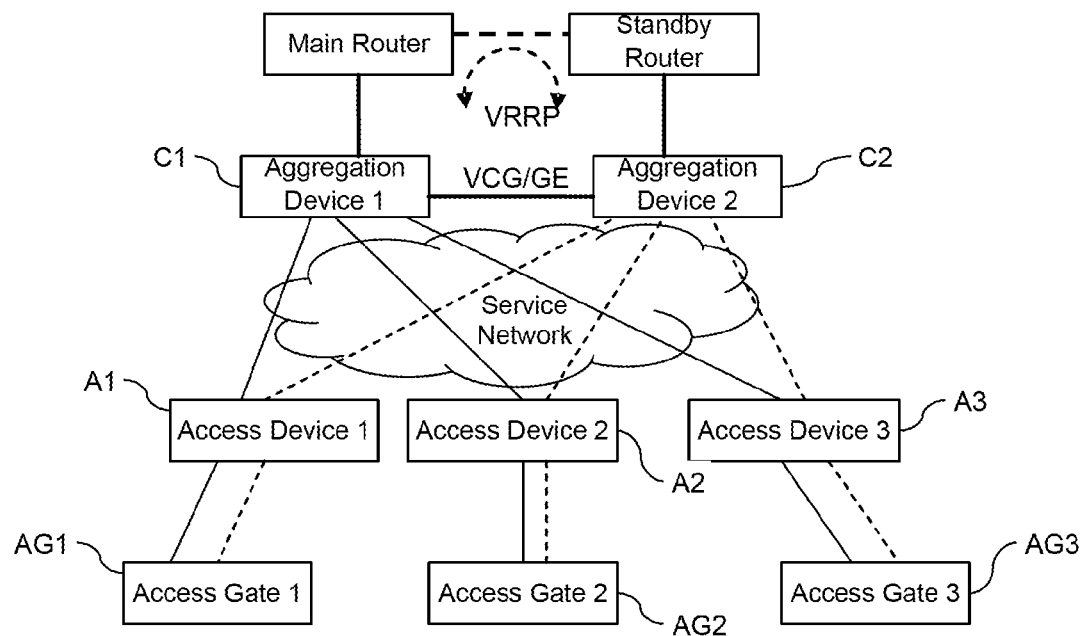
FIG. 1 is a networking schematic according to one embodiment of a prior art point-to-multipoint aggregation type network.
Figure 2:
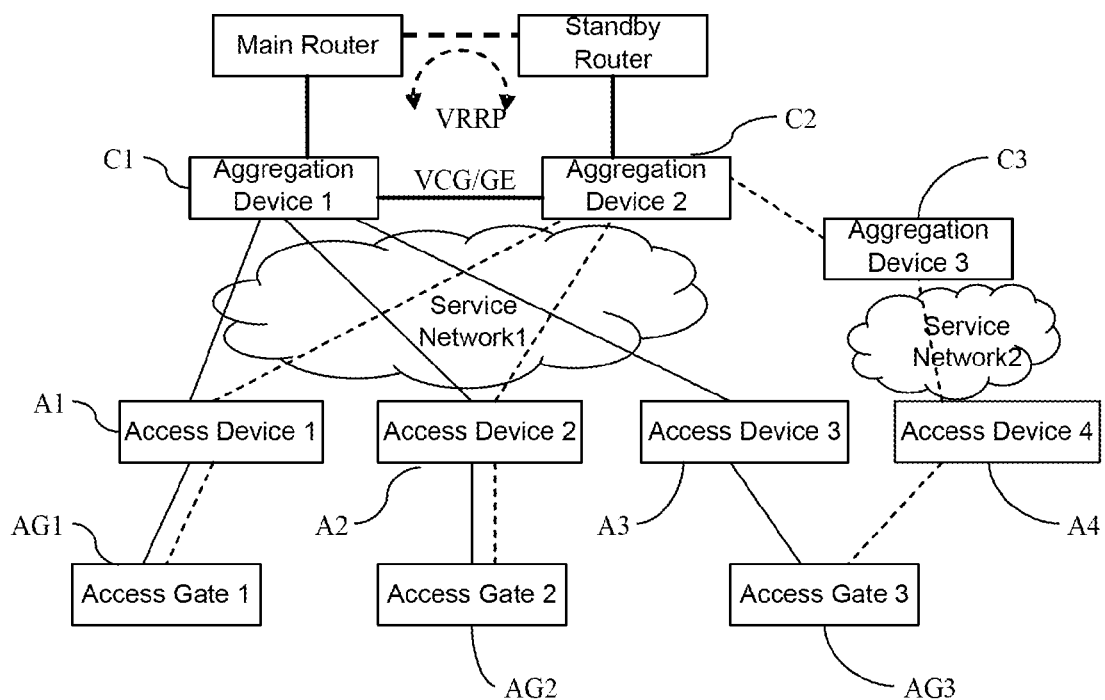
FIG. 2 is another networking schematic according to one embodiment of a prior art point-to-multipoint aggregation type network.
Figure 3:
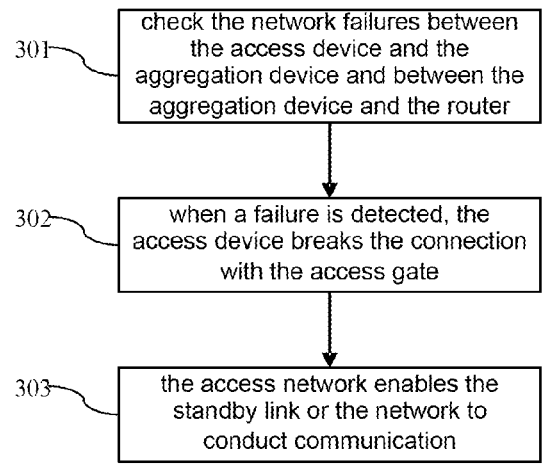
FIG. 3 is a flowchart of a method for implementing LPT in the point-to-multipoint network according to one embodiment the present invention.

As illustrated in FIG. 3, a method for implementing LPT in the point-to-multipoint network according to one embodiment of the present invention is presented by below steps.

Step 301: The link between the access device and the aggregation device and the link between the aggregation device and the router in the network are checked.

Step 302: When it is detected that a failure occurs in the link between the access device and the aggregation device or in the link between the aggregation device and the router, the access device actively breaks the connection with the access gate, causing a failure between the access device and the access gate.

Step 303: After the access device breaks the connection with the access gate, the access gate detects the failure that the access device could not be connected to the access network and enables the standby link to conduct communication.

Further, when a failure occurs in the link between the access gate and the access device, the access gate may directly detect the failure, thereby initiating the standby link to conduct communication.

According to the aforementioned method, no matter which type of failure occurs in the network, the access network is able to enable a standby link to conduct communication, thereby ensuring the reliability of the network communication.

Figure 4:
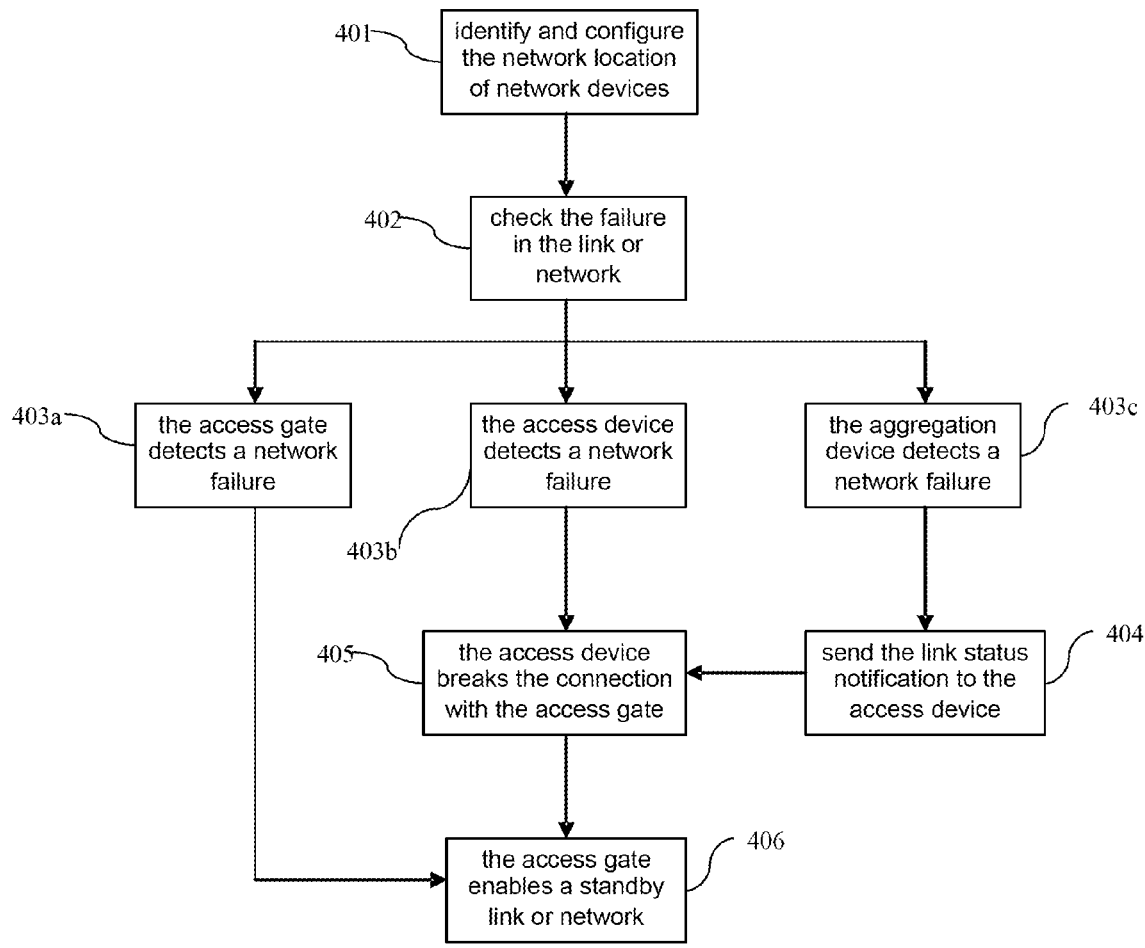
FIG. 4 is a flowchart of a method for implementing LPT in the point-to-multipoint network when a failure occurs according to one embodiment of the present invention.

As illustrated in FIG. 4, a method for implementing LPT in the point-to-multipoint network according to one embodiment of the present invention is presented as below.

Step 401: The network location of each network device in the network is identified and configured. Network devices can be generally categorized into an access gate (user equipment), an access device, an aggregation device and a router, etc.

Step 402: A real time check is made on any failure in the network. The check can be made by the access gate, the access device and the aggregation device simultaneously. Therefore, several scenarios as illustrated in step 403a, 403b and 403c may take place.

Step 403a: The access gate detects a network failure. Generally, the link failure detectable by the access gate is a failure in the link between access gate and the access device. When the access gate detects the link failure, step 406 is performed.

Step 403b: After the access device detects a failure in the service network between the access device and the aggregation device, step 405 is performed.

Step 403c: The aggregation device detects a network failure. Generally, the network failure detectable by the aggregation device is a failure in the service network between the access device and the aggregation device, or a failure in the link between the aggregation device and the router. No matter what type of failure is detected, step 404 should be performed.

Step 404: The aggregation device generates a link status notification. If the aggregation device detects a link failure in the service network, it is enough to send the link status notification to the affected access device. If the aggregation device detects a link failure between the aggregation device and the router, the link status notification needs to be sent to all the access devices and step 405 is performed.

The link status notification includes the following information: The device where a link or network failure is detected is an access device or an aggregation device; the detected failure is a link failure or a service network failure; the current link status is having a failure or recovered from a failure. The link status notification can be carried in a message, e.g., Ethernet message, Point-to-Point Protocol (PPP) message, or a management frame, such as a GFP management frame.

Step 405: When the access device detects a service network failure between the access device and the aggregation device or receives the link status notification indicating the link failure sent by the aggregation device, the access device breaks the connection with the access gate and step 406 is performed.

Step 406: When the access gate detects the disconnection with the access device, a standby link or network is enabled for communication.

In the above embodiment, when a failure occurred in the unidirectional link from the access device to the aggregation device, the access device is not able to detect the failure. However, the aggregation device may detect the failure and send the link status notification to the access device, informing the access device of the failure. Therefore, the access device may still handle the situation correctly. In addition, when the access device detects a failure in a link between the access gate and the access device or a failure in a service network between the access device and the aggregation device, the access device can also generate a link status notification to the aggregation device. After the aggregation device receives the link status notification, the aggregation device terminates the notification. To conserve the network resources, usually, this step is not taken. Because the access gate may disconnect the connection with the access gate after the access device detects a failure, the access gate then enables actively a standby link or network to conduct communication. If the aggregation device detects a failure in the service network between the access device and the aggregation device or a failure in the link between the aggregation device and the router, the aggregation device needs to send the link status notification to the access device. The reason for doing so is that if a unidirectional failure from the access device to the aggregation device occurs, the access device may not be able to detect the failure, and thus the access gate may not enable the standby link or network, then the message sent from the access gate may be lost in the process of being transmitted from the access device to the aggregation device, leading to communication interruption. If a failure occurs in a link between the aggregation device and the router, the access device still can not detect the failure, and thus the access gate may not enable the standby link or network, then communication interruption may also be incurred.

Figure 5:
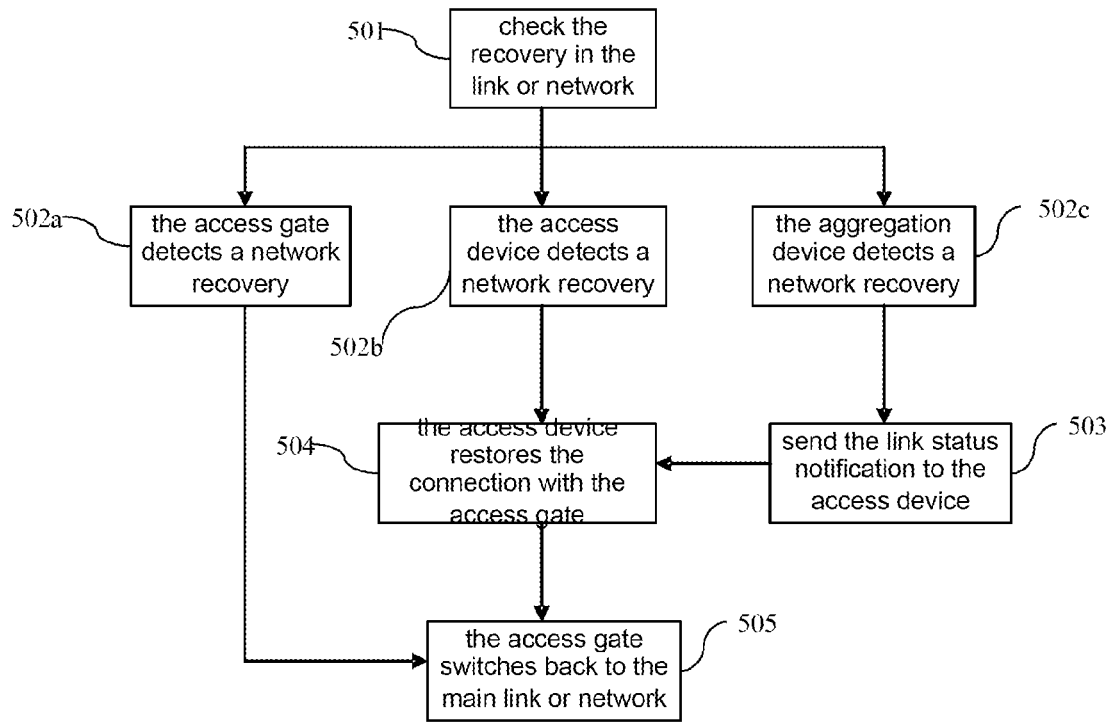
FIG. 5 is a flowchart of a of a method for implementing LPT in the point-to-multipoint network after the failure is repaired according to one embodiment of the present invention.

Besides enabling a standby link for communication and thus ensuring the reliability of the network communication, the active link or network can be restored for communication after the network failure is repaired according to another embodiment of the present invention as illustrated in FIG. 5. Besides the foregoing steps, the embodiment further includes the following steps.

Step 501: Scenarios as illustrated in step 502a, 502b and 502c may occur when detecting a recovery from the failure in the network.

Step 502a: When the access gate detects a recovery from the failure in the link between the access gate and the access device, step 505 is performed.

Step 502b: When the access device detects a recovery from the failure in the service network between the access device and the aggregation device, step 504 is performed.

Step 502c: When the aggregation device detects a recovery from the failure in the service network between the access device and the aggregation device or a recovery from the failure in the link between the aggregation device and the router, step 503 is performed.

Step 503: After the aggregation device generates a link status notification and sends the notification to the access device, step 504 is performed. The link status notification includes the following contents: the device where a link or network failure is detected is an access device or an aggregation device; the detected failure is a link failure or a service network failure; the current link status is having a failure or recovered from the failure. The link status notification can be carried in a message, e.g., Ethernet message, PPP (Point-to-Point Protocol) message, or in a management frame, such as GFP management frame.

Step 504: After the access device detects a recovery from a failure in the service network between the access device and the aggregation device or receives the link status notification indicating the recovery from the failure sent from the aggregation device, the access device restores the connection between the access gate and the access device and step 505 is performed.

Step 505: The access gate switches the communication back to the active link or network and reverts to the original communication status.

In the above embodiment, when a recovery from a failure in the unidirectional link from the access device to the aggregation device, the access device is not able to detect the recovery. However, the aggregation device may detect the recovery and send the link status notification to the access device, informing the access device of the recovery. Therefore, the access device may still handle the situation correctly. In addition, when the access device detects a recovery from the failure in the link between the access gate and the access device or a recovery from the failure in the service network between the access device and the aggregation device, the access device can also generate a link status notification to the aggregation device. After the aggregation device receives the link status notification, the aggregation device terminates the notification. To conserve the network bandwidth resources, usually, this step is not taken. Because the access device may reconnect with the access gate after the access device detects a recovery from a failure. The access gate then enables the active link or network to conduct communication. If the aggregation device detects a recovery from the failure in the service network between the access gate and the aggregation device or a recovery from the failure in the service network between the aggregation device and the router, then the aggregation device needs to send a link status notification to the access device. The reason for doing so is that the access device can not detect the recovery from the failure, and thus the connection with the access gate will not be restored, and therefore the access gate may not be able to switch back to the active link or network.

In the embodiment of the present invention, compatibility of the point-to-multipoint LPT with point-to-point LPT can be achieved by configuring both the devices at two ends to aggregation devices. For instance, the devices at two ends of the service network are configured as aggregation devices. When one of the aggregation devices (corresponding to the access device in the above embodiment) receives a LPT notification message from another aggregation device (corresponding to the aggregation device in the above embodiment) and it turns out that the parsed message is originated from the aggregation device, the first aggregation device disconnects the link with the user equipment (access gate) and allows the user equipment to switch to the standby link or network to conduct communication. Point-to-Point LPT is a special case of Point-to-Multipoint LPT.

Figure 6:
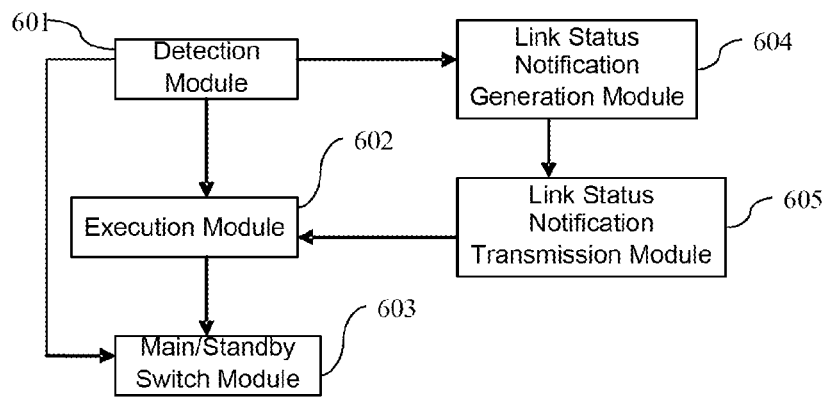
FIG. 6 is a schematic diagram of a device for implementing LPT in the point-to-multipoint network according to one embodiment of the present invention.

FIG. 6 illustrates a device for implementing LPT in the point-to-multipoint network according to one embodiment of the present invention. The device according to the embodiment includes: a detection module 601 configured to detect the status of the links or the status of service network in the network, where the links to be detected includes a link between an access gate and an access device, a link between an access device and an aggregation device, and a link between an aggregation device and a router, the content of the detection is link failure, and when a failure occurs in the link or service network, the detection module 601 may send a corresponding link status notification; an execution module 602 configured to break the connection between the access device and the corresponding access gate after receiving the link status notification indicating a link failure sent from the detection module 601; and an active/standby switch module 603 configured to switch the access gate from the active link to the standby link when the access gate and the access device are disconnected.

In another embodiment of the present invention, the detection module 601 may also be configured to detect a recovery from a link failure and send a link status notification indicating the recovery from the failure when detecting the recovery from the link failure. The execution module 602 may also be configured to restore the connection between the access device and the corresponding access gate when receiving the link status notification indicating the recovery from the failure sent from the detection module 601. The active/standby switch module 603 may also be configured to switch the access gate from the standby link to the active link when the access gate and the access device are reconnected.

In the foregoing two embodiments, the execution module 602 may be integrated into an access device so as to facilitate the control of disconnection and reconnection between the access device and the corresponding access gate. The active/standby switch module 603 may be integrated into an access gate so as to facilitate the control of switching the access gate from/to the active link and to/from the standby link.

In addition, the operation of sending the corresponding link status notification performed by detection module 601 may also be performed by a dedicated link status notification generation module 604 and a dedicated link status notification transmission module 605. When the detection module detects a failure in a certain link or a recovery from failure in a certain link, the detection module informs the link status notification generation module 604. The link status notification generation module 604 generates a link status notification according to the location of the link, failure occurrence or recovery from failure. The notification may be carried by a message or carried by a management frame. After the link status notification generation module 604 generates a link status notification, the link status notification transmission module 605 sends the notification to the execution module 602 for further processing.

As can be seen from the above embodiment, the embodiment of the present invention not only solves the LPT problem in point-to-multipoint network so that the local and remote devices can switch in time to a standby link or network for communication when a failure occurs in the link or network, the embodiment of the, but also achieves the point-to-point LPT function. Because an asymmetrical passing and processing of link status are employed according to embodiments of the present invention, the problem that all the other access points have to switch to a standby link or a standby network due to the failure in a single access point can be avoided. When a failure occurs in an aggregation link or network, all the access devices can be informed so that the access device can enable a standby link or network instantly to conduct communication. When a failure occurs in the service network, any device where a failure is detected may attempt to inform the other side of the network status. As such, the service interruption as a result of a remote device still using the original link or network to conduct communication when the remote device can not detect a failure can be avoided.

The above are merely specific embodiments of the present invention, while the scope of the present invention is not so limited. Any changes or equivalents contemplated easily are construed as within the scope of the present invention. Therefore, the scope of the present invention should be determined by the scope of the claims.

What is claimed is:

1. A method for implementing Link Pass Through in a point-to-multipoint network, wherein the network comprises an access gate, an access device, a first aggregation device, a second aggregation device, an active router and a standby router, the access gate being connected to the active router via the access device and the first aggregation device in an active link, and being connected to the standby router via the access device and the second aggregation device in a standby link; wherein the method comprises:

detecting, by the first aggregation device, a failure occurrence in the active link between the access device and the first aggregation device or between the first aggregation device and the active router;

when the first aggregation device detects the failure occurrence in the active link between the first aggregation device and the access device or between the first aggregation device and the active router, sending, by the first aggregation device, a first link status notification to the access device;

breaking, by the access device, a section of the active link between the access device and the access gate after receiving the first link status notification from the first aggregation device; and enabling, by the access gate, the standby link to conduct communication.

2. The method of claim 1, further comprising:

restoring, by the access device, the section of the active link between the access device and the access gate after the access device detects a recovery from the failure occurrence in the active link between the access device and the first aggregation device or between the first aggregation device and the active router; and switching, by the access gate, the communication to the active link.

3. The method of claim 1, further comprising:

detecting, by the first aggregation device, a recovery from the failure occurrence in the active link between the first aggregation device and the access device or between the first aggregation device and the active router;

sending, by the first aggregation device, a second link status notification to the access device after the first aggregation device detects the recovery from the failure occurrence;

restoring, by the access device, the section of the active link between the access device and the access gate after the access device receives the second link status notification; and switching, by the access gate, the communication to the active link.

4. The method of claim 1, wherein the first link status notification indicates that:

a device where the failure occurrence is detected is the access device or the first aggregation device;

the detected failure occurrence is a link failure or a service network failure.

5. The method of claim 1, further comprising:

restoring, by the access device, the section of the active link between the access device and the access gate after the access device detects a recovery from the failure in the active link between the access device and the first aggregation device; and switching, by the access gate, the communication to the active link.

6. An access device for implementing Link Pass Through in a point-to-multipoint network, wherein the network comprises an access gate, the access device, a first aggregation device, a second aggregation device, an active router and a standby router, the access gate being connected to the active router via the access device and the first aggregation device in an active link, and connected to the standby router via the access device and the second aggregation device in a standby link; the access device comprising:

a detection module, configured to detect a first link status notification sent from the first aggregation device when the first aggregation device detects the failure occurrence in the active link between the first aggregation device and the access device or between the first aggregation device and the active router;

an execution module, configured to break a section of the active link between the access device and the access gate after receiving the first link status notification sent from the first aggregation device; and an active/standby switch module, configured to switch a communication from the active link and to the standby link.

7. The access device of claim 6, wherein the execution module is further configured to restore the section of the active link between the access gate and the access device after the active link between the access device and the first aggregation device or between the first aggregation device and the active router has been recovered from the failure occurrence; and the active/standby switch module is further configured to switch the communication from the standby link to the active link when the active link is restored.

8. A point-to-multipoint network system for implementing Link Pass Through, comprising:

one or more access gates, one or more access devices, a first aggregation device, a second aggregation device, an active router and a standby router;

wherein each of the one or more access gates is connected to the active router via one of the one or more access devices and the first aggregation device in an active link, and connected to the standby router via the one of the one or more access devices and the second aggregation device in a standby link;

wherein when detecting a failure occurrence in the active link between the first aggregation device and the access device or between the first aggregation device and the active router, the first aggregation device sends a first link status notification to the access device;

wherein after receiving the first link status notification, the access device breaks a section of the active link between the access device and one of the one or more access gates it connects to; and the one of the one or more access gates enables the standby link for communication.

9. The network system of claim 8, wherein the one or more of the access devices restores the section of the active link between the access device and the one of the one or more access gates after detecting a recovery from the failure occurrence in the active link; and the one of the one or more access gates switches the communication to the active link.

10. The network system of claim 8, wherein the first aggregation device further sends a second link status notification to one of the one or more access devices after detecting a recovery from the failure in the active link between itself and the one of the one or more access devices or between itself and the active router;

the one of the one or more access devices restores the connection between itself and one of the one or more access gates after receiving the second link status notification; and the one of the one or more access gates switches the communication back to the active link.

11. The network system of claim 8, wherein the one of the one or more access devices further restores the section of the active link between the access device and the one of the one or more access gates after detecting a recovery from the failure in the active link between the access device and the first aggregation device; and the one of the one or more access gates switches the communication back to the active link.

* * * * *